United States Patent [19]
Weiss

[11] Patent Number: 4,830,912
[45] Date of Patent: May 16, 1989

[54] FLORAL CONTAINER

[76] Inventor: David A. Weiss, 19948 Esquiline, Walnut, Calif. 91789

[21] Appl. No.: 100,636

[22] Filed: Sep. 24, 1987

[51] Int. Cl.[4] .......................... A01G 5/04; A47G 7/00
[52] U.S. Cl. .................................... 428/23; 264/45.2; 264/46.6; 428/71; 428/36.5; 521/155
[58] Field of Search ............................ 428/23, 35, 71; 521/155; 264/45.2, 46.6

[56] References Cited

U.S. PATENT DOCUMENTS

| | | | |
|---|---|---|---|
| 3,414,456 | 12/1968 | Roberts | 428/35 |
| 3,419,455 | 12/1968 | Roberts | 428/35 |
| 3,420,729 | 1/1969 | Roberts | 428/35 |
| 3,493,257 | 2/1970 | Fitzgerald et al. | 428/315.9 X |

Primary Examiner—Henry F. Epstein
Attorney, Agent, or Firm—Grant L. Hubbard

[57] ABSTRACT

A body comprising a dimensionally stable film container filled to the dimensions defined by the film with polyurethane foam, the polyurethane foam being foamed in situ in the film container thereby forming an adhesive bond with the film.

5 Claims, 1 Drawing Sheet

FLORAL CONTAINER

FIELD OF THE INVENTION

This invention relates to polyurethane foam technology and to floral containers and pre-decorated ornaments and other objects manufactured using such technology, and to other techniques in which polyurethane foam is expanded in film which is dimensionally stable at ambient temperature but which is subject to softening, stretching or distortion when heated.

BACKGROUND OF THE INVENTION

Many substances and materials have been used to form containers for natural and artificial plants and flowers, referred to generally here as floral containers. Glass, clay, pottery, wood, polymers of many kinds, etc., for example, have been formed and used as floral containers.

It is also known to make shaped objects of an infinite variety of sizes and shapes using foamed polymers. Christmas tree ornaments, animal and fanciful figurines, utilitarian shapes, packaging, etc., for example have been made of polyurethane and other foamed plastics.

The technology of polyurethane foams is reasonable well developed. See, for example, the comprehensive discussion in Harper, HANDBOOK OF PLASTICS AND ELASTOMERS McGraw-Hill Book Company, 1975 and the current and past editions of the MODERN PLASTICS ENCYCLOPEDIA, as well as various treatises on urethane, polyurethane, plastic and elastomeric foams, isocyanates, etc.

One of the technologies reasonably well developed is that of forming polyurethane foams, either rigid or flexible, inside various containers to provide for strength, rigidity, continued buoyancy, or to provide other characteristics. For example, it is common in the boat industry to fill certain voids in the boat with closed-cell polyurethane foam. This renders that portion of the boat to be permanently buoyant and, if in sufficient volume compared with the displacement volume of the vessel, may render the entire vessel essentially unsinkable even though capsized.

Rigid polyurethane foams are used in various molded configurations to provide insulation as well as strength. For example, it is a fairly wide spread practice to use rigid polyurethane foam, typically foamed in place, between to shells of a refrigeration container, either a portable container or industrial container. The literature is replete with descriptions of various applications of rigid polyurethane foam technology in refrigeration and structural applications.

Typical rigid polyurethane products have a density of about 1.5 to 70 pounds per cubic foot with foams having a density generally in the 1.5 to 10 lb/ft$^3$ range. Polyurethane foams tend to be self extinguishing and have low water absorption. Closed-cell polyurethane foams, i.e. foams in which each discreet cell is isolated from each other discreet cell, with no communication there between, are excellent insulators and provide buoyancy as well as great strength. In addition, closed-cell polyurethane can be used as a container, since the cells do not communicate one with another.

Polyurethanes generally and polyurethane foams of interest here are formed by the reaction of an isocyanate or polyisocyanate with a polyol, e.g. a diol or triol. The reaction is generally spontaneous and exothermic at normal room temperatures. In many structural and other applications, the reaction is caused to occur in situ, by mixing the isocyanate and polyol, along with suitable surfactants, catalysts, and buoying agents, and injecting the mixture, essentially instantaneously upon being mixed into the cavity to be filled. As the reaction proceeds, the foam forms and grows to fill the cavity. Various nozzles, pumps, mixing chambers, mixing heads and other equipment are available for mixing the components, i.e. the polyol and isocyanate, along with additives, for particular purposes.

In common formulations, the additives are added to one or the other of the components so that one has two constituents or two mixtures which, when mixed, react to form the desired polyurethane. For example, surfactants, which are usually silicone based surfactants for stabilizing the foam, controlling cell size and structure, and catalysts, to effect the time of cure, are mixed in one or the other of the materials, e.g. in the polyol or in the isocyanate. Blowing agents, or desired, may be dissolved in the 'A' constituency mixture or in the 'B' constituency mixture so that when the 'A' and 'B' mixtures are themselves mixed the buoying agent is activated thermally or chemically or otherwise and produces a gas which causes the polymer to expand and form a foam of the desired type. In some reactions, water, or another hydroxyl containing chemical, is added which results in the self-generation of carbon dioxide as a buoying agent. In many applications, however, it is desirable to dissolve a particular blowing agent in one of the other of the mixtures. For example, the FREON TM series of fluorocarbons and chlorofluorocarbons include a number of constituents which are excellent blowing agents which are soluble in either component 'A' or component 'B', or both, and which, when heated, vaporize to form the desired foam composition. In rigid foams, of the type under consideration, fluorocarbons are usually the primary blowing agent with carbon dioxide being used occasionally as supplemental blowing agent.

The material of principal interest in respect to this invention is sometimes referred to as rigid, low density urethane foam, having a density of from about 1.5 to about 2.5 pounds per cubic foot. Density per se is not critical in this invention, however, and higher densities can as conveniently be used. This lower density foam is the type of urethane foam which is commonly used for thermal insulation in household refrigerators, freezers, picnic coolers, and other related products where low thermal conductivity is important. These foams have low thermal conductivity because of the high-molecular-weight flurorcarbon gas entrapped within the closed-cell structure of the foam. These foams can be used as containers, when in the suitable configuration, because of the closed-cell structure of the foam.

Among the isocyanates which are used in the manufacture of polyurethanes are tolylene diisocyanate, diphenylmethane diisocyanate, hexamethylene diisocyanate, dicyclohexylmethane diisocyanate and other polyisocyanates. Polyols used in the formation of polyurethane foams and other structures include glycerin, trimethylolpropane, 1,2,6-hexanetriol, alphamethylglycoside, pentaerythritol, sorbitol and sucrose. Rigid urethane foam formulations usually contain a polymeric isocyanate of the MDI type, e.g. 4,4'-diphenylmethane diisocyanate, and a non reactive blowing agent such as a fluorocarbon. Polyether polyols used in rigid urethane foams are generally more branched lowermolecularweight types. Flame retardants may also be added but are not critical in the present application. Tertiary amines such as tetramethylguanidine, N,N,N prime, N prime-tetramethylbutanediamine, and dimethylaminoethanol are used in most rigid urethane foam formulations.

The machinery for preparing the foam formulation consists of principally of two or more metering pumps which feed the reactants to a continuous mixer at controlled rates and in desired proportions. The mixed output proceeds to the forming device in which the foam rises and cures.

The proceeding background on rigid polyurethanes foams is given to aide the reader in understanding the background of the invention, but it is not necessary that the reader understand the chemistry of this polymer system in order to take advantage of the present invention. Indeed, the present inventor is not a chemist and has arranged to provide this background only in the interest of clarity and completeness.

In the gift and floral industries, there is a continuing need for new and unique approaches to containing floral arrangements, including flowers, cut and growing, and plants generally, as well as other decorative items.

Both ornamental and utilitarian articles comprising ambient dimensionally stable polymer film, decorated or undecorated, plain or bearing printed or other indicia, may be manufactured according to the process of this invention.

It is anticipated that the present invention will have application in wide fields of commerce and industry. For example, it is contemplated that signs and displays generally which include lettering, etc., structural elements in which the stressed-skin and foam combination coact synergistically to give added strength, ornamental and utilitarian objects of all sizes and shapes can be made using the present invention. While the best mode and present advantages of the invention involve film containers in the form of balloons, i.e. a small-entry, large volume container, the invention is applicable to any shape of film container and to containers in which only part of the wall is in the form of a film. Reference is frequently made to balloons, merely as exemplary, to containers of these types.

SUMMARY OF THE INVENTION

The present invention constitutes in one form, as an article of commerce, a floral arrangement container comprising an ambient temperature dimensionally stable film, filled with rigid polyurethane foam having portions thereof removed to form a container for the floral arrangement. The term "ambient temperature dimensionally stable film" means films such as polyester films, polycarbonate films, certain polyvinyl films, and other films which are at normal ambient temperatures, i.e. up to about 110° F., dimensionally stable in normal use. Such films do not stretch or distort at ambient temperatures and under forces usually encountered. Of course, even the strongest material may distort under sufficient force; however, forces in normal uses and handling are under consideration and are referred to here in connection with dimensional stability.

The present invention also contemplates a method for manufacturing such floral containers.

The present invention also contemplates a method for manufacturing articles of any convenient size using ambient dimensionally stable film as the mold or form and expanding polyurethane foam into the film mold or form.

In one sense, the present invention contemplates a rigid polyurethane foam filled dimensionally stable film form or mold of any desired configuration and suitable for any of a virtually infinite variety of uses.

The invention comprises, in one form, an article of commerce, in the form of a body comprising an ambiently dimensionally stable film balloon filled to the dimensions defined by the film with polyurethane foam. The solid body resulting may be used as is, or as modified, either as an ornament or aesthetic object, e.g. a christmas tree ornament, statue, etc, or as a utilitarian object such as a rigid packing form, a structural element, an item of furniture, etc. In addition, a well may be formed in the body by removal of a portion of the film and the foam, the well forming a receptacle for floral arrangements, thus forming a floral container.

In another facet, the invention comprises a process of manufacturing a body comprising injecting an isocyanate and polyol mixture into a dimensionally stable, freely suspended balloon and maintaining the balloon in a chamber which is controlled to contain an atmosphere of at least about 80% relative humidity during the formation of polyurethane foam therein. Preferably, the relative humidity in the controlled humidity chamber is maintained at a level of at least 88%.

DESCRIPTION OF THE BEST MODE

Figure 1:
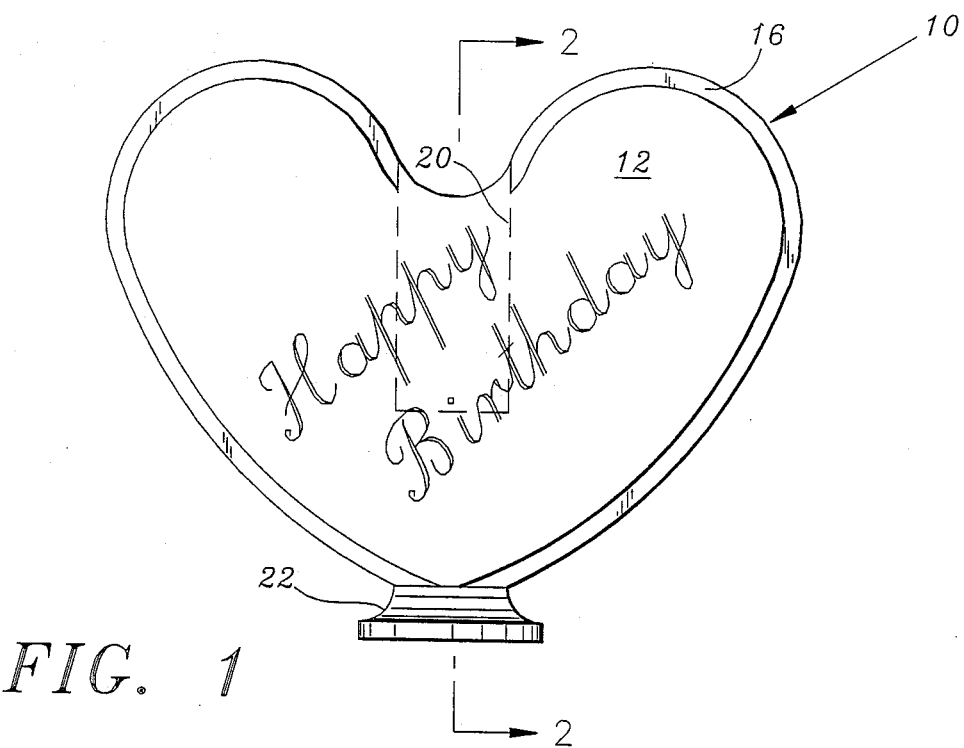
FIG. 1 is a front elevational view of a container of the present invention showing an exemplary but non-limiting example of a configuration in which the floral container can be manufactured.

In the following discussion, specific examples, materials, configurations, and other information will be given. It is to be understood, however, that this information is merely exemplary, and is non-limiting.

While it may seem, at first glance, especially to the novice, that there was nothing particularly unique or unusual in injecting a polyurethane mixture into a container of any size, configuration, material, etc., and allowing the reaction to proceed to form a rigid foam. In many materials and environments it is, indeed, very simple to fill a container with polyurethane foam and such processes are essentially free from chemical, physical and other complexities. Such is not true, however, with film molds or forms of the present invention.

In the manufacture of floral containers of the type contemplated by this invention, in which an ambiently stable film in the form of a balloon is expanded and filled with rigid polyurethane foam, the problem is not nearly so simple nor the solution apparent as one might at first blush guess. MYLAR ®, polyethylene terephthalate film, has high strength, and great dimensional rigidity, i.e. does not stretch, at normal room temperatures. For convenience, MYLAR will be used as the most common example of the type of films suitable for use with the present invention, but without implying a limitation to such films; indeed, MYLAR is but a convenient example of an ambiently dimensionally stable film suitable for use in the present invention. MYLAR ™ films can be printed with a variety of inks as well. These characteristics, as well as the gas-impervious characteristics of the film which permit the films to hold helium for long periods of time have made MYLAR balloons a favorite for decorative, greeting and other purposes. MYLAR ™ balloons, filled with air or helium, imprinted with messages such as "Happy Birthday", "Happy Anniversary", etc., are well known.

I conceived of using MYLAR ™ balloons of this type, i.e. a film forming a large closed container with a comparatively small opening, as a mold or form for rigid polyurethane foam. In this manner, I conceived, the balloon could be made permanently inflated, and, in addition, could be modified in shape so as to form a base, support, holder, container or other support for plants and flowers. This entire spectrum of applications I have lumped under the term "floral container".

Early efforts to construct a MYLAR ™ balloon filled with rigid polyurethane foam failed. The failure was apparent in a number of ways. Principally, the heat of reaction, the exothermic heat produced by the foaming reaction, heated the MYLAR ™ film to a temperature where it became soft and stretched or deformed under the pressure applied by the foam. Sometimes the stretching would occur in gas pockets and the end result would be voids inside the balloon. Sometimes the balloon lost its configuration entirely. Sometimes the balloon burst and permitted the foam to escape. After considerable effort, it was concluded that the principle source of the problem was that the exothermic heat of reaction of the resin system overheated the film, in which dimensional rigidity was of great importance.

Failures also occurred with the printing. The inks upon which patterns, messages and other information or data were printed on the MYLAR ™ would not withstand the temperatures resulting from the exothermic foaming reaction. Sometimes, even if the temperature was not high enough to cause gross distortion of the balloon, the ink would run, mottle, discolor, or simply become unreadable. Immersing the balloon in water is not a satisfactory solution to the problem. First of all, many of the inks wash off, soften, or flow when exposed to water. Secondly, the water tends to produce different hydrostatic pressures on different portions of the balloon depending, for example, on the depth of the particular balloon under the water. In addition, the presence of water, which has a very high heat capacity, tends to inhibit the foaming reaction adjacent the surface of the film resulting in asymmetric foaming and sometimes distortion of the shape of the body inside the balloon. Immersing the balloon in a refrigerated atmosphere causes similar distortions and additional problems resulting from the non-uniform inhibition of the foaming reaction.

The problem faced differs from that faced in most rigid polyurethane applications where the mold is, in effect, a rigid wall or form. In the manufacture of boats, coolers, ice chests, etc., the foam is contained in a space defined by rigid walls or rigid surfaces In such a container the foam will fill up the container and exert greater pressure which simply compresses the gas in the foam, but the foam necessarily conforms to the configuration of the rigid walls. This was not the case, however, with MYLAR ™ balloons. What happened was that the form, i.e. the balloon, softened, lost its shape and/or lost the dimensional stability required for good product control.

While I have but limited understanding of the chemistry of the system, I have discovered a solution to the problem faced in attempting to use MYLAR ™, or comparable dimensionally stable film, as all or part of mold. I have discovered that if the relative humidity is above 80% and, preferably above about 88%, at ambient temperatures of from about 60° to about 100°, the ambient temperature range being totally non-critical, sufficient heat is removed from the outer surface of the MYLAR ™ film to permit the foaming reaction to go to completion and at the same time to remove sufficient heat from the surface of the MYLAR ™ to prevent distortion, stretching or melting of the MYLAR ™ and to prevent distortion or damage or discoloration of the printing. While I have referred to certain texts and treatises on the chemistry of the system, to which I add Doyle, THE DEVELOPMENT AND USE OF POLYURETHANE PRODUCTS, McGraw-Hill Book Company, New York, 1971, the significant feature of this invention is the discovery that forms, e.g. balloons, made of MYLAR ™, or other dimensionally stable film, can be filled with rigid polyurethane foam using conventional injection-foaming techniques provided the injection takes place at a generally ambient room temperature and provided that the relative humidity is at least 80% and preferably above about 88%.

The drawings exemplify one preferred embodiment of the invention, but are not limiting as to the scope and application of the invention.

A solid body 10 in the shape of a heart, the shape being merely incidental, formed of a MYLAR polyethylene terephthalate film, or other dimensionally stable film, balloon comprising two halves 12 and 14 adhesively bonded together as shown at 16 and filled with foamed rigid polyurethane 18 is depicted in FIG. 1. As shown, a message and/or decorative patterns may be printed on the MYLAR. The body, which may be any shape and size, can be used as a body, as a structural element, as an ornament or otherwise. If desired, in one preferred embodiment, a well 20 is drilled or hole-sawed in the body of the MYLAR-polyurethane for holding the floral arrangement. By reference to a floral arrangement, I mean natural or artificial plants, flowers or other attractive or colored items. A base 22 may optionally be provided.

Figure 3:
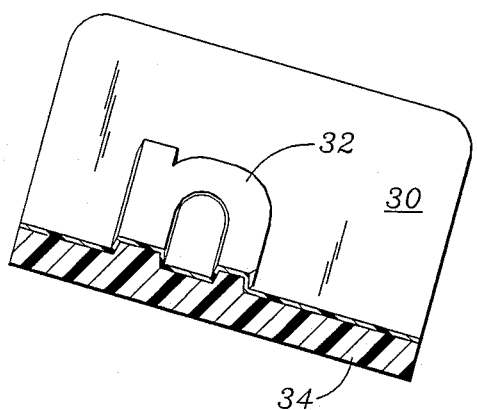
FIG. 3 is a sign board with a raised letter, shown in partial cross section, manufactured according to the method of this invention, being shown merely to illustrate one of the variety of applications of the process of the present invention.
Figure 2:
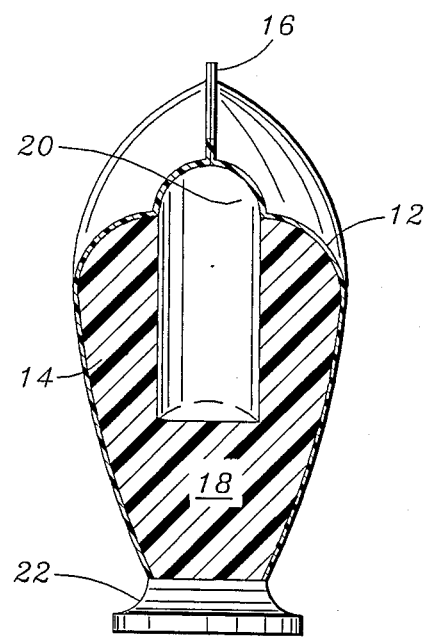
FIG. 2 is cross section taken substantially along lines 2—2 in the direction of the arrows showing the internal construction of the floral container of this invention.

FIG. 3 depicts an application of the invention to the formation of bodies, e.g. raised letter signa, in which a pattern, in this example a letter "B", is embossed in the film. Thus the MYLAR film 30 has be previously embossed with a desired pattern 32 and is filled with polyurethane foam 34 according to the process of this invention.

The invention is carried out by injecting a suitable formulation of isocyanate, typically MDS diisocyate, and polyol, along with suitable blowing agent, e.g. fluorocarbon, surfactant, e.g. polyoxyethylene, and, if desired, fire retardant, along with typical catalysts such as stannous octoate, etc. into the MYLAR balloon and, most importantly, permitting the foam to rise and fill the balloon while the balloon is maintained in an atmosphere having at least about 82% relative humidity and preferably at least 88% relative humidity. The temperature is not critical; however, for worker convenience ambient temperatures of from about 68 to 80 degrees F are preferred. Higher temperatures or lower temperatures can be used but are quite uncomfortable. In addition, it is more difficult to introduce enough moisture into high temperature air to produce the necessary relative humidity condition. On the other hand, it is relatively easy to introduce moisture into warm air and cool the air to attain the desired relative humidity.

The entire work area serve as a controlled humidity chamber and can be maintained at the necessary relative humidity; however, it is less expensive and more convenient to provide a smaller humidity chamber into which the balloon is inserted just before or immediately upon injection of the polyurethane thereinto such that all or at least the great majority of foam production occurs while the balloon is in the humidity chamber.

It has been discovered that attempting to produce the articles of this invention in a humidity of less than about 80 or 82 percent relative humidity results in unsatisfactory quality products. In such instances, the balloons are incompletely filled, distorted, stretched or otherwise disfigured and/or the ink has run, discolored or distorted. Only at relative humidities above about 88% is it possible produce consistently high quality product wherein the foam fills the balloon and the balloon and printing or decoration thereupon retains their dimensionally integrity.

The formulation of the mix has not been found to be critical, though formulations which have a higher rate of exothermic heat may require higher relative humidities than formulations which exotherm at a lower rate. The differences are not great however. Typical formulations would comprise approximately equal amounts of isocyanate and polyol, based on the number of reactive groups available, i.e. equal numbers of CNO and OH groups. Blowing agents, surfactants, fire retardants and catalysts in amounts up to two or three percent are added according to normal formulations.

While the process finds convenient application in the manufacture of bodies in which a free MYLAR TM film balloon comprises the mold, the invention is not confined to this application and may be used in any application wherein a free film which has dimensional integrity at ambient temperatures is used to confine the shape of a body during the formation of the body by polyurethane foam producing reactions.

INDUSTRIAL APPLICATION

This invention finds application in the manufacture of rigid and flexible polyurethane foam bodies, such as floral containers.

What is claimed is:

1. A body comprising a dimensionally stable film container filled to the dimensions defined by the film with polyurethane foam, the polyurethane foam forming an adhesive bond with the film, the polyurethane foam being formed in situ the free film container by injecting a mixture of isocyanate, polyol and foam-producing blowing agent into a free, ambiently dimensionally stable polymeric film, the free film defining the form for molding the polyurethane foam, and maintaining the form in an atmosphere of at least about 80% relative humidity during the formation of polyurethane foam therein.

2. The body of claim 1 wherein a well is formed in the body by removal of a portion of the film and the foam, the well forming a receptacle for floral arrangements.

3. The process of manufacturing a body comprising injecting a polymerizable mixture consisting essentially of isocyanate, polyol and blowing agent in such proportions as to form a foam upon polymerization thereof into a free film container which forms a mold for the polymerizable mixture, the free film being an ambiently dimensionally stable polymeric film, and maintaining the free film container in a humidity chamber wherein the atmosphere comprises at least about 80% relative humidity during the formation of polyurethane foam therein to prevent the heat of the polymerization reaction from distorting the free film beyond its stable dimensions.

4. The process of claim 3 wherein the relative humidity is maintained at a level of at least 88%.

5. The Process of claim 4 wherein the form is a balloon formed of the film.

* * * * *